United States Patent
Xu et al.

(10) Patent No.: US 11,220,269 B2
(45) Date of Patent: Jan. 11, 2022

(54) FORDING DEPTH ESTIMATION

(71) Applicant: International Business Machines Corporation, Armonk, NY (US)

(72) Inventors: Cheng Xu, Beijing (CN); Su Liu, Austin, TX (US); Kuo-Liang Chou, New Taipei (TW); Shun Xian Wu, Beijing (CN); Yin Xi Guo, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 16/372,756

(22) Filed: Apr. 2, 2019

(65) Prior Publication Data

US 2020/0317206 A1  Oct. 8, 2020

(51) Int. Cl.
*B60W 40/076* (2012.01)
*G06K 9/00* (2006.01)

(52) U.S. Cl.
CPC ....... *B60W 40/076* (2013.01); *G06K 9/00791* (2013.01); *B60W 2552/15* (2020.02)

(58) Field of Classification Search
CPC .......... B60W 40/076; B60W 2552/15; B60W 40/04; B60W 2552/20; G06K 9/0079; G06K 9/00791; G06K 9/00818
See application file for complete search history.

(56) References Cited

U.S. PATENT DOCUMENTS

| 9,597,961 | B2 | 3/2017 | Tran et al. |
| 9,714,038 | B1 | 7/2017 | He |

| 2003/0198402 | A1* | 10/2003 | Zhang | G06T 15/04 382/276 |
| 2014/0218481 | A1* | 8/2014 | Hegemann | H04N 13/271 348/46 |
| 2015/0066339 | A1* | 3/2015 | Hoare | B60W 40/06 701/116 |
| 2017/0015329 | A1* | 1/2017 | Furukawa | B60W 40/06 |

FOREIGN PATENT DOCUMENTS

| CN | 103253190 A | 8/2013 |
| CN | 104691407 A | 6/2015 |
| JP | 2018018424 A | * 2/2018 |

OTHER PUBLICATIONS

Machine Translation of JP-2018018424-A, Feb. 2018, JP, Kamata Takahiro (Year: 2018).*
English Translation of Publication CN 108621998 A Title: For Depth Detection System and Method of Vehicle Date: Oct. 9, 2018 Author: Tang, Shuai (Year: 2018).*

(Continued)

*Primary Examiner* — James J Lee
*Assistant Examiner* — Steven Vu Nguyen
(74) *Attorney, Agent, or Firm* — Patterson + Sheridan, LLP

(57) ABSTRACT

A computer-implemented method for fording depth estimation based on a real-time image recognition is provided according an embodiment of the present disclosure. In the method, a first image of a low-lying road being submerged under a bridge can be acquired. At least one second image of the low-lying road without being submerged can be determined. A fording depth of the low-lying road can be estimated based on the first image and the at least one second image.

16 Claims, 7 Drawing Sheets

(56) References Cited

OTHER PUBLICATIONS

English Translation of Publication CN 208189042 U Title: A Weather Ship Laser Detecting System Date: Dec. 4, 2018 Author: Liu etal (Year: 2018).*
English Translation of Publication DE 102014213107 A1 Title: Vehicle Assistance System Date: Jan. 7, 2016 Author: Knopp et al. (Year: 2016).*
English Translation of Publication CN 101561305 A Author: He, Qing Title: Underbridge or Tunnel Road Accumulation Water Monitoring Early Warning System and Method Date: Oct. 21, 2009 (Year: 2009).*

* cited by examiner

FORDING DEPTH ESTIMATION

BACKGROUND

The present disclosure relates to image processing, and more specifically, to fording depth estimation based on a real-time image recognition.

Weather conditions may have a huge impact on road safety. In a heavy rainy day, roads with excessive water accumulation can be observed everywhere. A driver may have problems to estimate a wading condition of a front road, as the driver's visibility may be affected. Therefore, it is risky to drive over the wading roads.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to an embodiment of the present disclosure, there is provided a computer-implemented method for fording depth estimation based on a real-time image recognition. In the method, a first image of a low-lying road being submerged under a bridge can be acquired. Then, at least one second image of the low-lying road without being submerged can be determined. Moreover, a fording depth of the low-lying road can be estimated based on the first image and the at least one second image.

According to an embodiment of the present disclosure, there is provided a system for fording depth estimation based on a real-time image recognition. The system may comprise one or more processors, a memory coupled to at least one of the processors, and a set of computer program instructions stored in the memory. The set of computer program instructions may be executed by at least one of the processors to perform the above method.

According to an embodiment of the present disclosure, there is provided a computer program product for fording depth estimation based on a real-time image recognition. The computer program product may comprise a computer readable storage medium having program instructions embodied therewith. The program instructions executable by a processor causes the processor to perform the above method.

In addition to the exemplary aspects and embodiments described above, further aspects and embodiments will become apparent by reference to the drawings and by study of the following descriptions.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
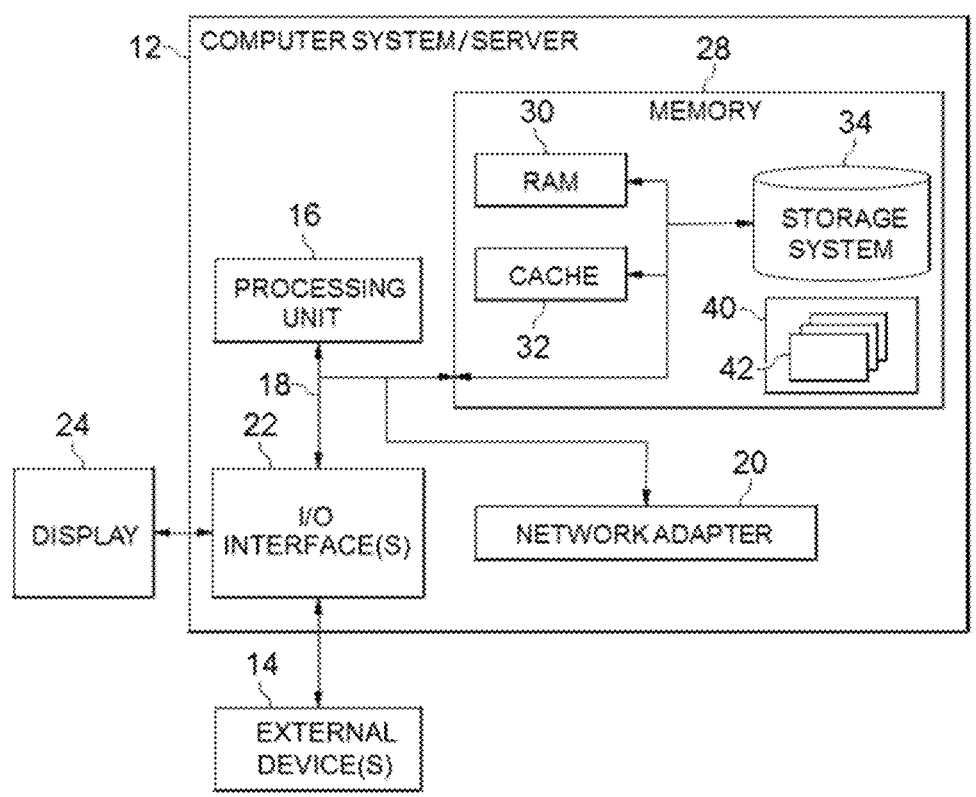
FIG. 1 depicts a cloud computing node according to an embodiment of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system-server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
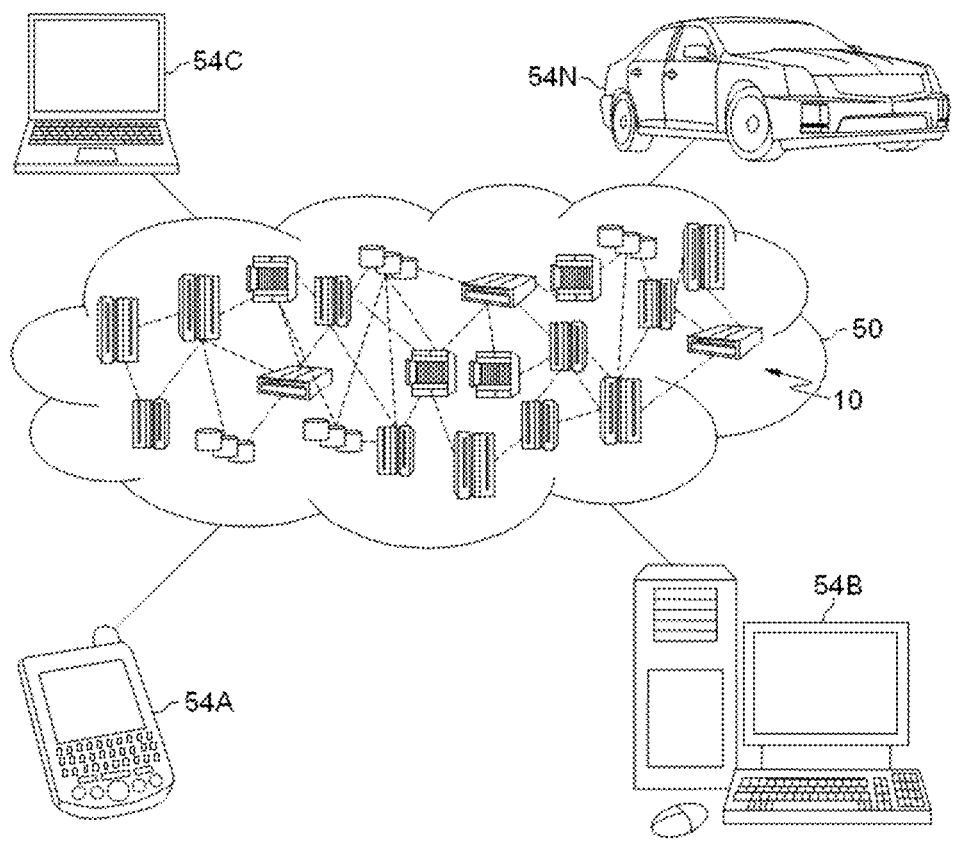
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
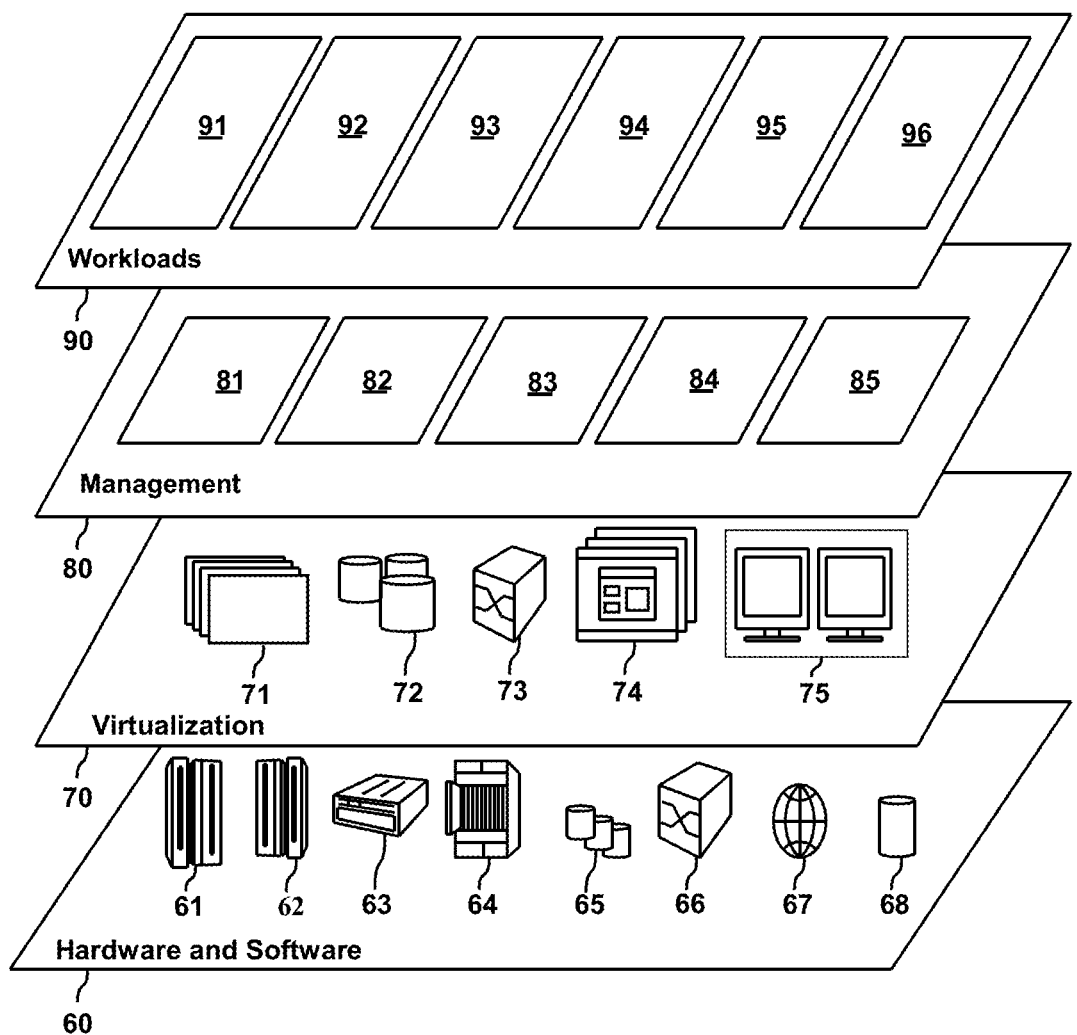
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64: storage devices 65: and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92: virtual classroom education delivery 93; data analytics processing 94; transaction processing 95; and fording depth estimation 96.

Generally, a low-lying road passing under a bridge can be observed with excessive water accumulation in a heavy rainy day. Driving through a body of water having a significant depth is very dangerous. Therefore, it is desirable to obtain accurate information relating to environment that the vehicle is about to enter. It is of particular advantage to ascertain, in advance of a vehicle being disposed in the body of water, an estimation of the depth of the body of water on the low-lying road. The depth of the body of water can also be referred to as a fording depth.

The real-time image recognition is a technique of acquiring an image, processing the image according to at least a grey scale of the image, analyzing the image using machine learning, and returning the analysis result sufficiently quickly.

Figure 4:
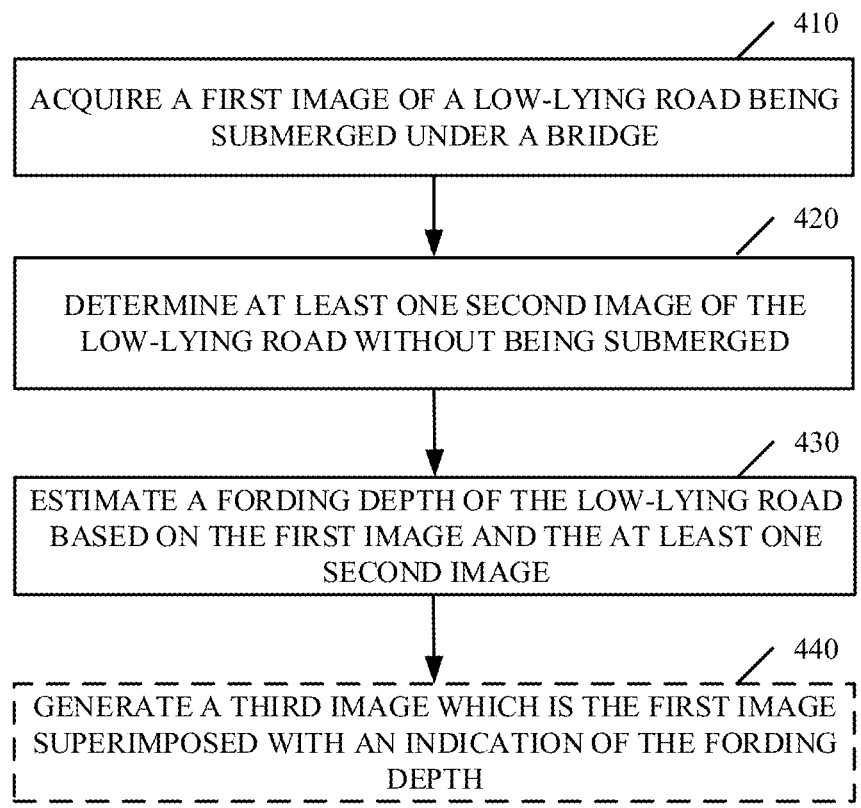
FIG. 4 depicts a schematic flowchart of a method for fording depth estimation based on a real-time image recognition according to an embodiment of the present disclosure.

With reference now to FIG. 4, it shows a schematic flowchart of the method for fording depth estimation based on a real-time image recognition according to an embodiment of the present disclosure. The embodiment will be described in detail below in conjunction with the Figures.

Figure 5:
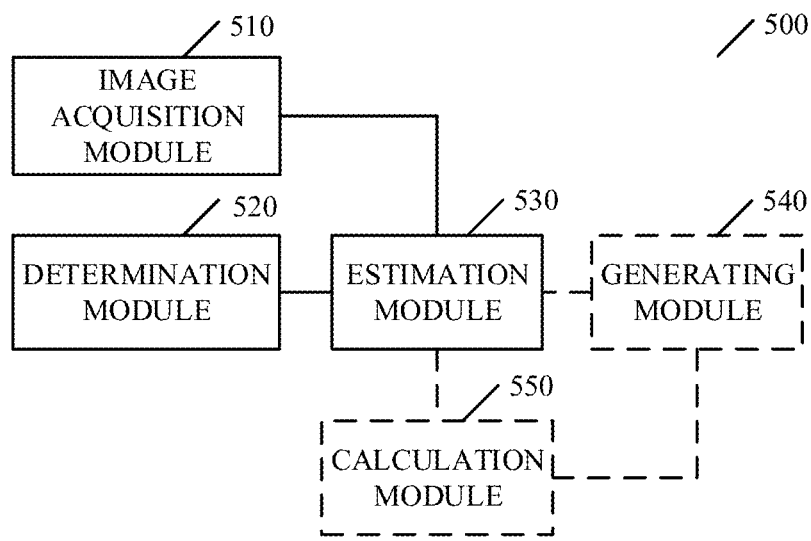
FIG. 5 depicts a schematic diagram of an apparatus for fording depth estimation in which the method shown in FIG. 4 is implemented.

It can be noted that the processing of the fording depth estimation according to embodiments of this disclosure could be implemented by an apparatus 500 for fording depth estimation shown in FIG. 5. As FIG. 5 shows, the apparatus 500 may comprise an image acquisition module 510, a determination module 520, and an estimation module 530. The respective modules of the apparatus 500 could be implemented by the computer system/server 12 in FIG. 1.

As shown in FIG. 4, at block 410, the image acquisition module 510 acquires a first image of a low-lying road being submerged under a bridge.

In an embodiment, the image acquisition module 510 may be coupled to an imaging device arranged on a vehicle. The imaging device may comprise a camera, for example, a travelling data recorder with a camera. While the vehicle is travelling on a road, the imaging device can collect an image with respect to a surrounding environment of the vehicle by taking a picture and/or a video. The image acquisition module 510 then can acquire the collected image from the imaging device. The collected image comprises the picture and/or a frame of the video.

In some embodiment, the imaging device may be amounted on a front windshield of a vehicle, and thus may collect an image with respect to the front road. In a case that the front road is submerged under a bridge, the imaging device may collect the front image before the vehicle is about to wade, as the first image. In this way, the first image can be transmitted from the imaging device to the image acquisition module 510 before the vehicle actually enters into the wading scenario.

Figure 6:
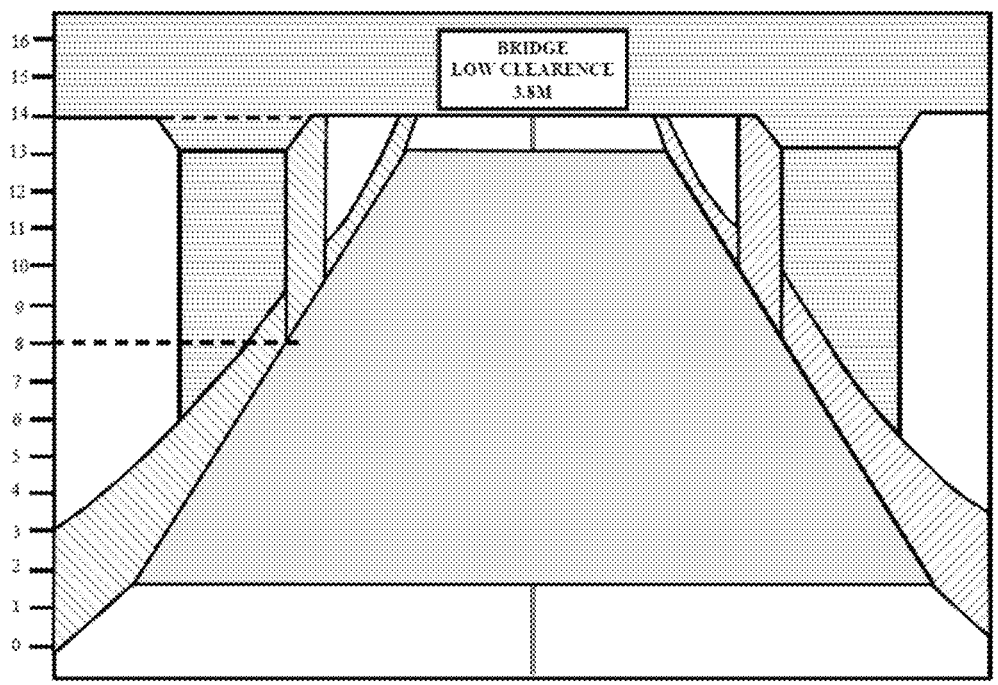
FIG. 6 depicts a schematic diagram of an example of a first image according to an embodiment of the present disclosure.

FIG. 6 shows a schematic diagram of an example of the first image. As shown in FIG. 6, the first image depicts a low-lying road being submerged under a bridge. Dashed area in the first image represents the bridge and roadsides. The bridge comprises bridge piers which are upright supports for the bridge. As FIG. 6 shows, parts of the bridge piers are submerged in water. A bridge sign is shown on the bridge, which indicates a clearance height of the bridge, referred to as low clearance. The clearance height of the bridge means an actual height from a low edge of the bridge to a ground surface. Moreover, grey area represents water area on the low-lying road.

At block 420, the determination module 520 determines at least one second image of the low-lying road without being submerged.

In an embodiment, the determination module 520 may be coupled to a locating device arranged on the vehicle. The locating device, for example, comprises a Global Position System. Therefore, the determination module 520 may determine a location of the vehicle via the locating device, such that a location of the low-lying road can be determined.

Moreover, a large number of images with respect to a plurality of roads can be stored in a database and/or an online system for searching, retrieval and comparison purposes. These images can be a valuable resource for another vehicle travelling on a same road. In this way, an image repository can be established based on the stored images. Therefore, the determination module 520 may search for the at least one second image of the low-lying road without being submerged from the image repository based the location of the vehicle.

It can be understood that the first image and the second image have a similar viewing angle, as they are both collected by vehicles driving on a same road. The major difference between the first image and the second image is whether the same road is submerged under the bridge or not.

Figure 7:
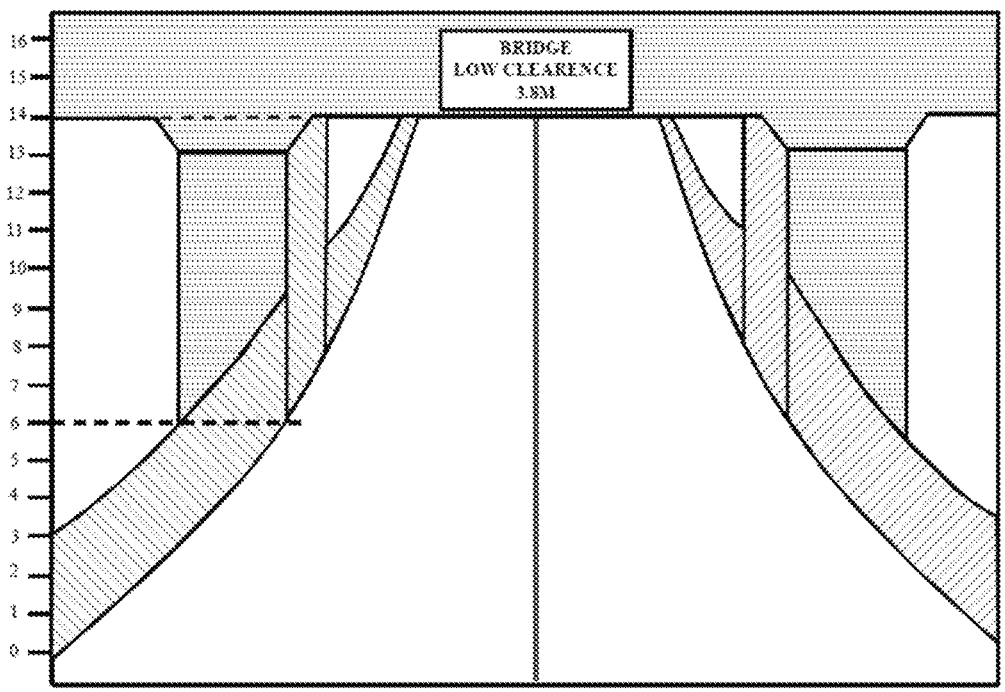
FIG. 7 depicts a schematic diagram of an example of a second image according to an embodiment of the present disclosure.

FIG. 7 shows a schematic diagram of an example of the second image. As shown in FIG. 7, the second image depicts the low-lying road without being submerged. Similar with FIG. 6, the dashed area in the second image represents the bridge and the roadsides in FIG. 7. Moreover, FIG. 7 also shows a ground surface of the low-lying road. The lowest points of the bridge piers contact the ground surface.

Then at block 430, the estimation module 530 estimates a fording depth of the low-lying road based on the first image and the at least one second image.

In an embodiment, the estimation module 530 may scale the first image and/or the at least one second image, such that the first image and the at least one second image are in a same scale size. For example, the estimation module 530 may perform image recognition on the first image and the at least one second image, to identify a same object in the respective images. Then, the estimation module 530 may adjust the scale sizes of the respective images, such that the identified objects in the respective images have the same size. Therefore, the scale sizes of the first image and the at least one second image are unified.

Then, the estimation module 530 may further identify the bridge sign of the bridge by image recognition of the first image and/or the second image. As shown in FIG. 6 and FIG. 7, the estimation module 530 may determine that the clearance height is 3.8 m.

Moreover, when the estimation module 530 may identify a low edge of the bridge and a water line of the road from the first image. The water line can represent a water surface at the bridge piers. In this way, the estimation module 530 may determine a first length, which is a vertical distance between the low edge of the bridge and the water line of the low-lying road in the first image. As shown in FIG. 6, the estimation module 530 may determine that the vertical coordinate of the low edge of the bridge is at about 14 units and the vertical coordinate of the water line is at about 8 units. Then, the estimation module 530 may determine that the first length is about 6 units (i.e., 14 units−8 units=6 units).

In addition, the estimation module 530 may also identify a low edge of the bridge and a ground line of the road from the second image. The ground line can represent the ground surface of the road, which can be identified as the lowest point of the bridge piers. Then, the estimation module 530 may determine a second length, which is a vertical distance between the low edge of the bridge and the ground line of the low-lying road in the second image. Referring to FIG. 7, the estimation module 530 may determine that the vertical coordinate of the low edge of the bridge is at about 14 units and the vertical coordinate of the ground line is at about 6 units. Therefore, the estimation module 530 may determine the second length is about 8 units (i.e., 14 units−6 units=8 units).

Accordingly, the estimation module 530 may estimate the fording depth based on the clearance height of the bridge, the first length and the second length.

For the above example, the estimation process can be described as follows.

The estimation module 530 may calculate a unit height $H_1$ based on the clearance height of the bridge and the second length. The unit height $H_1$ indicates an actual height which one unit in the respective images stands for.

$$H_1 = 3.8 \text{ m}/8 \text{ units} = 0.475 \text{ m}$$

Then, the estimation module 530 may estimate a bridge-water height $H_2$ based on the first length and the unit height $H_1$. The bridge-water height $H_2$ indicates an actual height between the low edge of the bridge and the water line of the low-lying road. That is, the bridge-water height $H_2$ corresponds to the first length in the first image.

$$H_2 = 6 \text{ units} \times 0.475 = 2.85 \text{ m}$$

Thus, the fording depth FD of the low-lying road can be estimated based on the clearance height of the bridge and the bridge-water height $H_2$.

$$FD=3.8\ m-2.85\ m=0.95\ m$$

Alternatively, the estimation module 530 may also calculate a third length between the water line and the ground line in the respective images, and estimate the fording depth FD based on the third length and the unit height $H_1$, as follows.

$$FD=(8\ units-6\ units)\times 0.475=0.95\ m$$

The above example is illustrated with one second image. In a further embodiment, for improving accuracy, the estimation module 530 may also determine at least two second images at block 420. Then, the estimation module 530 may identify the respective second lengths in the respective second images, and estimate an arithmetic mean of the respective second lengths. The arithmetic mean is a statistical indicator that characterizes trends in a data set. The arithmetic mean can be calculated as a sum of a set of data divided by the number of data of the set. For example, the estimation module 530 may estimate the arithmetic mean of the 3 second lengths from 3 second images by calculating a sum of the 3 second lengths and dividing the sum by 3. Accordingly, the estimation module 530 may estimate the unit height $H_1$, the bridge-water height $H_2$, and the fording depth FD more accurate.

According to the embodiments of the present disclosure, the fording depth of the road under the bridge can be estimated by comparing the first image of the low-lying road in a fording condition taken in a real time and the second image of the low-lying road without fording from the image repository.

In some embodiments, information about the estimated fording depth can become available online. For example, after the fording depth is determined for a low-lying road under a bridge, the estimation result can be saved locally in the database or saved in the online system. Therefore, the estimation result can be accessible by other users, devices or database systems.

Furthermore, the apparatus 500 for fording depth estimation may further comprise a generating module 540, as shown in FIG. 5. The generating module 540 may generate a prompt of the estimated fording depth. As shown in FIG. 4 at block 440, the generating module 540 may generate a third image, which is the first image superimposed with an indication of the fording depth, for example a number 0.95 m approximately to the water line. In some embodiments, the generating module 540 may be coupled to a display device, such as a display screen on the dashboard of the vehicle. The display device may display the third image in a real time.

Moreover, the generating module 540 may also generate a voice prompt of the estimated fording depth. The generating module 540 may be coupled to a speaker arranged on the vehicle. The voice prompt of the fording depth can be transmitted via the speaker before the vehicle enters into the water.

In this way, the driver can know the fording depth in time. Thus, the driver can make an informed decision before the vehicle enters into the body of water.

Figure 8:
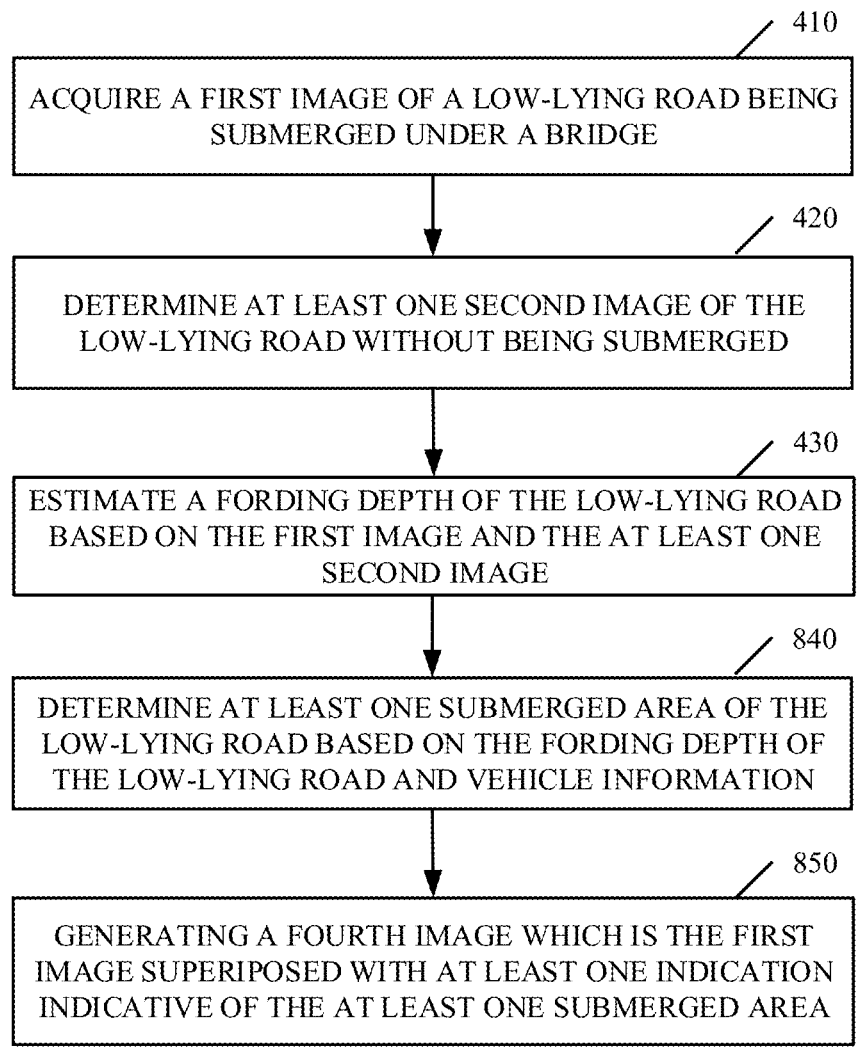
FIG. 8 depicts a schematic flowchart of a method for submerged area determination according to an embodiment of the present disclosure.

FIG. 8 shows a schematic flowchart of a method for submerged area determination according to an embodiment of the present disclosure. As shown in FIG. 8, block 410, 420 and 430 are described in the above.

As shown in FIG. 5, the apparatus 500 may further comprise a calculation module 550. At block 840, the calculation module 550 determines at least one submerged area of the road based on the fording depth of the low-lying road and vehicle information. Herein, the fording depth of the low-lying road can be determined according to the method shown in FIG. 4.

A wading capacity of a vehicle represents a depth of water that the vehicle can be waded. The wading capacity mainly depends on certain vehicle information. The vehicle information, for example, can comprise a height of chassis and/or a height of air intake. It can be understand that the vehicle information may vary from different type of vehicles. Generally, the height of the air intake is an indicator of the vehicle's wading capacity. Once the water enters into the air intake, it may cause the engine of the vehicle to stall. Serious damage can also cause permanent damage to the engine.

Figure 9:
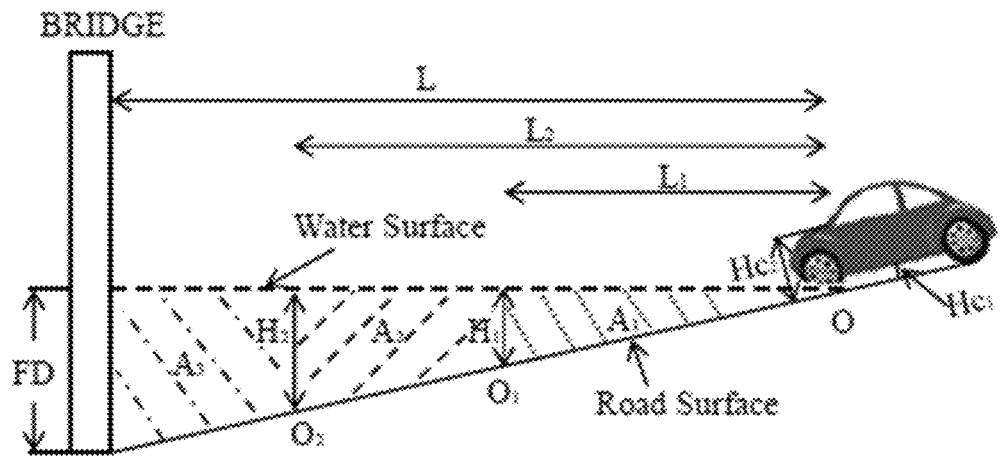
FIG. 9 depicts a schematic diagram of an example illustrating the submerge areas according to an embodiment of the present disclosure.

FIG. 9 shows a schematic diagram of an example for illustrating submerged area determination according to an embodiment of the present disclosure.

As shown in FIG. 9, the height of chassis $Hc_1$, also called a ride height, is a vertical distance between a lowermost point of wheels (where they contact the ground surface) and the lowermost point of a body of the vehicle. The height of the chassis $Hc_1$ is generally around 20 cm to 25 cm. The body of the vehicle comprises a windscreen and a bonnet covering an engine bay. The air intake is located between the windscreen and the bonnet. The height of air intake $Hc_2$ is a vertical distance between the lowermost point of wheels and the air intake. Generally, the height of the air intake $Hc_2$ is around 60 cm to 65 cm.

In some embodiment, the vehicle information with respect to a plurality of vehicle types can also be saved locally in the database and/or saved in the online system. Therefore, a vehicle profile can be established based on the vehicle information of the plurality of vehicle types. The calculation module 550 may acquire the vehicle information of a certain type of vehicle based on the vehicle profile.

When a vehicle is about to enter into the body of the water on a downhill road as shown in FIG. 9, the calculation module 550 may determine an initial wading position O based on image recognition. The initial wading position O is a critical position between wading and not wading. The calculation module 550 may be coupled to the locating device. Thus, the calculation module 550 may determine an initial distance L horizontally between the initial position O and the bridge via the locating device. For example, the locating device is a global position system and the like.

It is assumed that the downhill road has a uniform slope angle $\theta$. Then, the calculation module 550 may further determine the slope angle $\theta$ of the road based on the initial distance L and the fording depth FD of the road under the bridge, wherein the fording depth FD can be estimated according to the method shown in FIG. 4. For example, the determination process can be implemented by using a trigonometric function formula, $\tan \theta = FD/L$. For example, when the fording depth FD is determined as 0.95 m and the initial distance L is determined as 109 m, thus the slope angle $\theta$ can be determined as 0.5 (i.e., $\theta = \arctan(0.95/109) \approx 0.5$).

Therefore, the calculation module 550 may determine a first position $O_1$ on the road. In an embodiment, the calculation module 550 may determine a first distance $L_1$ between the initial position O and the first position $O_1$ based on the height of the chassis $Hc_1$ of the vehicle and the slope angle $\theta$ of the road. For example, the determination process can be implemented by using a trigonometric function formula, $L_1 = H_1/\tan \theta$. In an example that the height of the chassis is 12 cm and the slope angle $\theta$ is 0.5, the first distance $L_1$ can be calculated as follows.

$$L_1 = Hc_1/\tan \theta = 12\ cm/\tan 0.5 \approx 1375\ cm$$

In another embodiment, as equation tan θ=FD/Hc$_1$=H$_1$/L$_1$, the calculation module 550 may also determine the first distance L$_1$ based on the fording depth of the road under the bridge, the initial distance L and the height of the chassis Hc$_1$, as follows.

$$L_1 = L \times Hc_1 / FD$$

Therefore, the calculation module 550 may determine a first submerged area A$_1$ between the initial position O and the first position O$_1$ as a shallow submerged area, as the fording depth in this area is below the chassis of the vehicle. It is safe for the vehicle driving through the first submerged area A$_1$.

Moreover, the calculation module 550 may also determine a horizontal distance between the bridge and the first position O$_1$ based on the initial distance L and the first distance L$_1$ (i.e., L–L$_1$).

In an embodiment, the calculation module 550 may determine a second position O$_2$. In an embodiment, the calculation module 550 may determine a second distance L$_2$ between the initial position O and the second position O$_2$ based on the height of the air intake Hc$_2$ of the vehicle and the slope angle θ of the road. In an example that the height of the air intake Hc$_2$ is 60 cm and the slope angle θ is 0.5, the second distance L$_2$ can be calculated as follows.

$$L_2 = H2/\tan\theta = 60 \text{ cm}/\tan 0.5 = 6875 \text{ cm}$$

In another embodiment, as equation tan θ=FD/Hc$_2$=H$_2$/L$_2$, the calculation module 550 may also determine the first distance L$_2$ based on the fording depth of the road under the bridge, the initial distance L and the height of the chassis Hc$_2$, as follows.

$$L_2 = L \times Hc_2 / FD$$

Therefore, the calculation module 550 may determine a second submerged area A$_2$ between the first position O$_1$ and the second position O$_2$ as a deep submerged area, as the fording depth in this area is below the air intake of the vehicle and above the chassis of the vehicle. The driver might need to be very careful and better lower speed to pass over the second submerged area A$_2$.

Accordingly, the calculation module 550 may determine a third submerged area A$_3$ between the second position O$_2$ and the bridge as a dangerous submerged area. In this area, the fording depth is even deeper than the height of the air intake. Engine of the vehicle may be turned off when water enters into the air intake. Therefore, it is very dangerous for the vehicle.

It is to be noted that, the different submerged areas can be determined with respect to different type of vehicle. In some embodiments of the present disclosure, when the chassis is submerged in the water, some type of vehicle may be shut down, such that the second submerged area A$_2$ is also a dangerous submerged area.

Moreover, the calculation module 550 may also determine a horizontal distance between the bridge and the second position O$_2$ based on the initial distance L and the second distance L$_2$ (i.e., L–L$_2$).

As FIG. 8 shows, at block 850, the generating module 540 may further generate a fourth image, which is the first image superimposed with at least one indication of the at least one submerged areas. For example, the submerged areas can be indicated with color washes.

Figure 10:
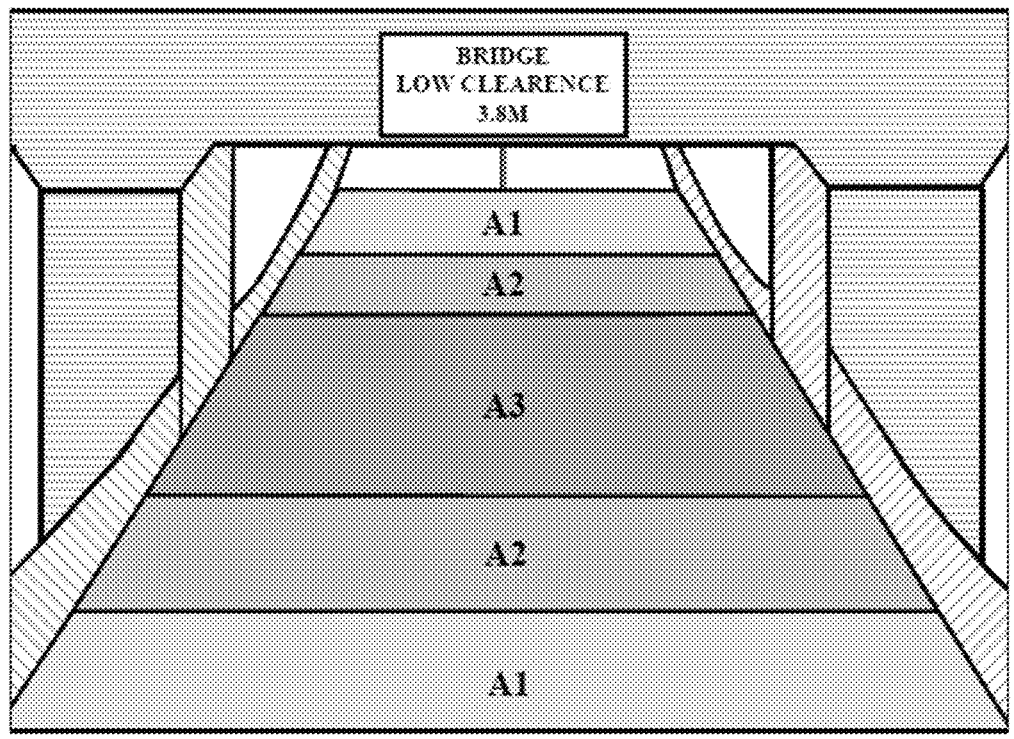
FIG. 10 depicts a schematic diagram of an example of a fourth image according to an embodiment of the present disclosure.

In an embodiment, the display device of the vehicle may display a real-time image superimposed with the respective color wash indicative of the respective submerged areas. For example, the screen may display the fourth image with green indicating the first submerged area, yellow indicating the second submerged area, and red indicating the third submerged area. FIG. 10 depicts a schematic diagram of an example illustrating three submerged areas (the first submerged area A$_1$, the second submerged area A$_2$, and the third submerged area A$_3$) according to an embodiment of the present disclosure. If the driver saws the third submerged area A3 when the vehicle just wades, he/she may have enough time to stop the vehicle before further submerged.

In some embodiments, in a case that a maximum fording depth of the road is below the height of the chassis of the vehicle, the screen may only display the real-time image by indicating the first submerged area. When the maximum fording depth of the road is below the height of the air intake of the vehicle and above the chassis of the vehicle, the screen may display the real-time image by indicating the first submerged area and the second submerged area. In addition, in a case that a maximum fording depth of the road is beyond the air intake of the vehicle, the screen may display the real-time image by indicating the first submerged area, the second submerged area, and the third submerged area.

In some embodiments, the calculation module 550 may further determine a distance from a current position of the vehicle to the first position O$_1$. Moreover, the calculation module 550 may further determine a distance from a current position of the vehicle to the second position O$_2$. Then the generating module 540 may generate a voice prompt indicating the calculated distance, such that the speaker of the vehicle may prompt how far the vehicle from the current position to the first position O$_1$ and/or the second position O$_2$.

The driver is thereby provided with clear information relating to the depth of water ahead of the vehicle before entering the water. Moreover, when the vehicle starts wading, the driver can be provided with specific submerged areas. In this way, the drive may possibly make an informed decision. For example, the driver can make the decision whether to progress into the water based on a green zone on the screen, or to reduce the speed of the vehicle based on a yellow zone on the screen, or alternatively, to avoid entering into the water and to take a different route when the screen display a red zone.

Additionally, in some embodiments of the disclosure, a system for fording depth estimation based on a real-time image recognition can be provided. The apparatus may comprise one or more processors, a memory coupled to at least one of the processors, and a set of computer program instructions stored in the memory. The set of computer program instructions may be executed by at least one of the processors to implement the method shown in FIG. 4. In the method, a first image of a low-lying road being submerged under a bridge can be acquired. Then, at least one second image of the low-lying road without being submerged can be determined. Moreover, a fording depth of the low-lying road can be estimated based on the first image and the at least one second image.

In some other embodiments of the disclosure, a computer program product for fording depth estimation based on a real-time image recognition can be provided. The computer program product may comprise a computer readable storage medium having program instructions embodied therewith. The program instructions, when executed by a processor, cause the processor to implement the method shown in FIG. 4. In the method, a first image of a low-lying road being submerged under a bridge can be acquired. Then, at least one second image of the low-lying road without being submerged can be determined. Moreover, a fording depth of the low-lying road can be estimated based on the first image and the at least one second image.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
acquiring, by one or more processors using an image capture device, a first image of a road submerged underwater under a bridge;
determining, by the one or more processors, a second image of the road not submerged underwater, comprising:
retrieving the second image from an online repository of images based on searching the online repository of images using a global positioning system (GPS) value relating to a location from which the first image was captured;
estimating, by the one or more processors, a fording depth of the road based on the first image and the second image, comprising:
scaling at least one of the first image or the second image, based on identifying a same object in the first image and the second image using image recognition and matching size of the object in the first image and the second image; and
estimating the fording depth based on determining a clearance height of the bridge based on using image recognition to identify the clearance height on a road sign captured in at least one of the first image or the second image;
determining, by the one or more processors, at least one submerged area of the road based on the fording depth of the road and vehicle information, wherein the vehicle information comprises a height relating to the vehicle; and
generating, by the one or more processors, a third image comprising the first image superimposed with at least one indication of the at least one submerged area.

2. The method according to claim 1, wherein the estimating the fording depth of the road based on the first image and the second image comprises:
determining, by the one or more processors, the clearance height of the bridge and a first length which is a vertical distance between a low edge of the bridge and a water line of the road based on the first image;
determining, by one or more processors, a second length which is a vertical distance between the low edge of the bridge and a ground line of the road based on the second image; and
estimating, by one or more processors, the fording depth of the road based on the clearance height of the bridge, the first length and the second length.

3. The method according to claim 1, further comprising:
generating, by the one or more processors, a fourth image comprising the first image superimposed with an indication of the fording depth.

4. The method according to claim 1, wherein the image capture device is arranged on a vehicle.

5. The method according to claim 4, wherein the location from which the first image was captured comprises a location of the vehicle.

6. The method according to claim 1, wherein the height relating to the vehicle comprises at least one of the following:
a height of an air intake or a height of a chassis.

7. A system, comprising:
one or more processors; and
a memory having instructions stored thereon which, when executed on the processor, performs an operation comprising:
acquiring, using an image capture device, a first image of a road submerged underwater under a bridge;
determining a second image of the road not submerged underwater, comprising:
retrieving the second image from an online repository of images based on searching the online repository of images using a global positioning system (GPS) value relating to a location from which the first image was captured; and
estimating a fording depth of the road based on the first image and the second image, comprising:
scaling at least one of the first image or the second image, based on identifying a same object in the first image and the second image using image recognition and matching size of the object in the first image and the second image; and
estimating the fording depth based on determining a clearance height of the bridge based on using image recognition to identify the clearance height on a road sign captured in at least one of the first image or the second image;
determining at least one submerged area of the road based on the fording depth of the road and vehicle information, wherein the vehicle information comprises a height relating to the vehicle; and
generating a third image comprising the first image superimposed with at least one indication of the at least one submerged area.

8. The system according to claim 7, wherein the operation further comprises:
determining the clearance height of the bridge and a first length which is a vertical distance between a low edge of the bridge and a water line of the road based on the first image;
determining a second length which is a vertical distance in the scale between the low edge of the bridge and a ground line of the road based on the second image; and
estimating the fording depth of the road based on the clearance height of the bridge, the first length and the second length.

9. The system according to claim 7, wherein the operation further comprises:
generating a fourth image comprising the first image superimposed with an indication of the fording depth.

10. The system according to claim 8, wherein the image capture device is arranged on a vehicle.

11. The system according to claim 10, wherein the location from which the first image was captured comprises a location of the vehicle.

12. The system according to claim 7, wherein the height relating to the vehicle comprises at least one of the following:
a height of an air intake or a height of a chassis.

13. A computer program product, comprising a computer readable storage medium having program instructions embodied therewith, the program instructions executable by a processor to cause the processor to perform an operation comprising:

acquiring, using an image capture device, a first image of a road submerged underwater under a bridge;

determining a second image of the road not submerged underwater, comprising:

retrieving the second image from an online repository of images based on searching the online repository of images using a global positioning system (GPS) value relating to a location from which the first image was captured; and estimating a fording depth of the road based on the first image and the second image, comprising:

scaling at least one of the first image or the second image, based on identifying a same object in the first image and the second image using image recognition and matching size of the object in the first image and the second image; and estimating the fording depth based on determining a clearance height of the bridge based on using image recognition to identify the clearance height on a road sign captured in at least one of the first image or the second image;

determining at least one submerged area of the road based on the fording depth of the road and vehicle information, wherein the vehicle information comprises a height relating to the vehicle; and generating a third image comprising the first image superimposed with at least one indication of the at least one submerged area.

14. The computer program product of claim 13, the operation further comprising:

determining the clearance height of the bridge and a first length which is a vertical distance between a low edge of the bridge and a water line of the road based on the first image;

determining a second length which is a vertical distance between the low edge of the bridge and a ground line of the road under the bridge based on the second image; and estimating the fording depth of the road based on the clearance height of the bridge, the first length and the second length.

15. The computer program product of claim 13, the operation further comprising:

generating a fourth image comprising the first image superimposed with an indication of the fording depth.

16. The computer program product of claim 14, wherein the image capture device is arranged on a vehicle.

* * * * *